United States Patent
Richardson

(10) Patent No.: US 12,316,513 B2
(45) Date of Patent: *May 27, 2025

(54) HIGH PERFORMANCE COMPUTE INFRASTRUCTURE AS A SERVICE

(71) Applicant: Hewlett Packard Enterprise Development LP, Spring, TX (US)

(72) Inventor: Andrew Richardson, Hemel Hempstead (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 12 days.

This patent is subject to a terminal disclaimer.

(21) Appl. No.: 18/328,195

(22) Filed: Jun. 2, 2023

(65) Prior Publication Data

US 2023/0308368 A1    Sep. 28, 2023

Related U.S. Application Data

(63) Continuation of application No. 16/287,518, filed on Feb. 27, 2019, now Pat. No. 11,695,654.

(51) Int. Cl.
*H04L 41/50* (2022.01)
*H04L 9/40* (2022.01)
*H04L 41/22* (2022.01)
*H04L 67/10* (2022.01)

(52) U.S. Cl.
CPC .......... *H04L 41/5077* (2013.01); *H04L 67/10* (2013.01); *H04L 41/22* (2013.01); *H04L 63/0428* (2013.01)

(58) Field of Classification Search
CPC ..... H04L 41/5077; H04L 41/22; H04L 67/10; H04L 63/0428
See application file for complete search history.

(56) References Cited

U.S. PATENT DOCUMENTS

| 9,612,877 B1 | 4/2017 | Noll et al. |
| 10,020,998 B2 | 7/2018 | Gonzales et al. |
| 2012/0042256 A1 | 2/2012 | Jamjoom et al. |

(Continued)

FOREIGN PATENT DOCUMENTS

IN    04140CH2015    2/2017

OTHER PUBLICATIONS

Advania.com; "HPC as a Service"; printed on Sep. 21, 2018 from webpage: https://advania.com/hpc/hpcaas/; 5 pages.

(Continued)

*Primary Examiner* — Emmanuel L Moise
*Assistant Examiner* — Xiang Yu
(74) *Attorney, Agent, or Firm* — Slater Matsil, LLP

(57) ABSTRACT

A high performance computing environment includes a plurality of computing resources, a plurality of tenant clouds organized from the plurality of computing resources, and an Infrastructure as a Service resource manager. The Infrastructure as a Service resource manager further includes a plurality of Infrastructure as a Service system interfaces and a portal. In operation, a cloud user interacts over a secure link and through the portal with the Infrastructure as a Service system interfaces to perform cloud tasks relative to a particular one of a plurality of tenant clouds of the high performance computing environment.

15 Claims, 5 Drawing Sheets

(56) References Cited

U.S. PATENT DOCUMENTS

| | | | |
|---|---|---|---|
| 2014/0280948 A1* | 9/2014 | Schmidt | H04L 63/0272 |
| | | | 709/226 |
| 2015/0032894 A1 | 1/2015 | Rosensweig et al. | |
| 2015/0058459 A1 | 2/2015 | Amendjian et al. | |
| 2015/0295731 A1 | 10/2015 | Bagepalli et al. | |
| 2016/0105392 A1 | 4/2016 | Thakkar et al. | |
| 2019/0318100 A1* | 10/2019 | Bhatia | G06F 21/554 |

OTHER PUBLICATIONS

Brightcomputing.com; "About Bright Computing"; printed on Sep. 21, 2018 from webpage: http://www.brightcomputing.com/about; 3 pages.

Cantrell, T.; "hpcDIRECT—Powerful, Agile, Efficient"; Dec. 8, 2017; 5 pages.

Hagan, A.; "Nimbix Launches HPC Hybrid Cloud Platform with JARVICE 3.0"; Jun. 19, 2018; 3 pages.

Hewlett Packard Enterprise Development LP, "HPE Insight Cluster Management Utility v8.2", Jun. 2018, 11 pages.

Hewlett Packard Enterprises, "A Platform for Delivering Superior HPC Cloud Services", Technical White Paper, Jul. 2018, 17 pages.

Hewlett Packard Enterprises, "Rescale: As-a-Service Model for HPC Hybrid Clouds", Aug. 2018, 10 pages.

One Stop Systems; "One Stop Systems Announces Composable Infrastructure Solutions at Sc17"; Nov. 13, 2017; 3 pages Richardson et al., "HPC Infrastructure as a Service Top Level Design", Final Version 1.0, Jul. 2017, 31 pages.

\* cited by examiner

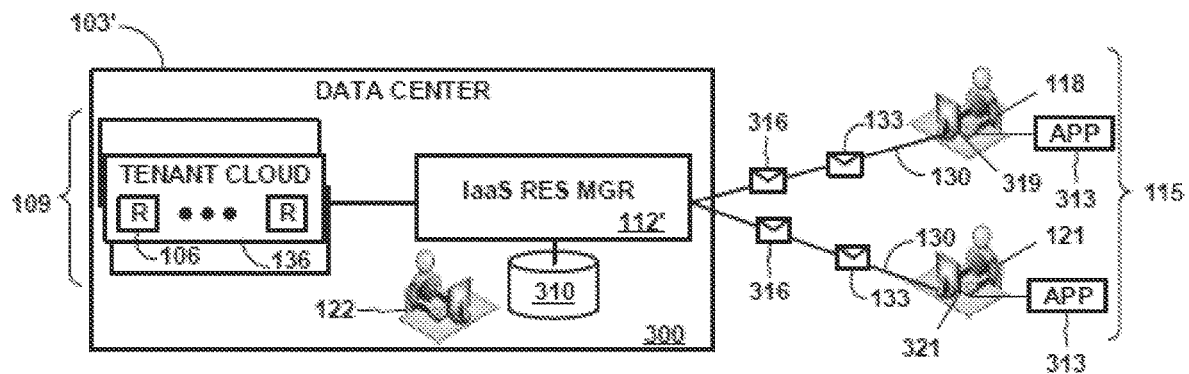
Figure 3
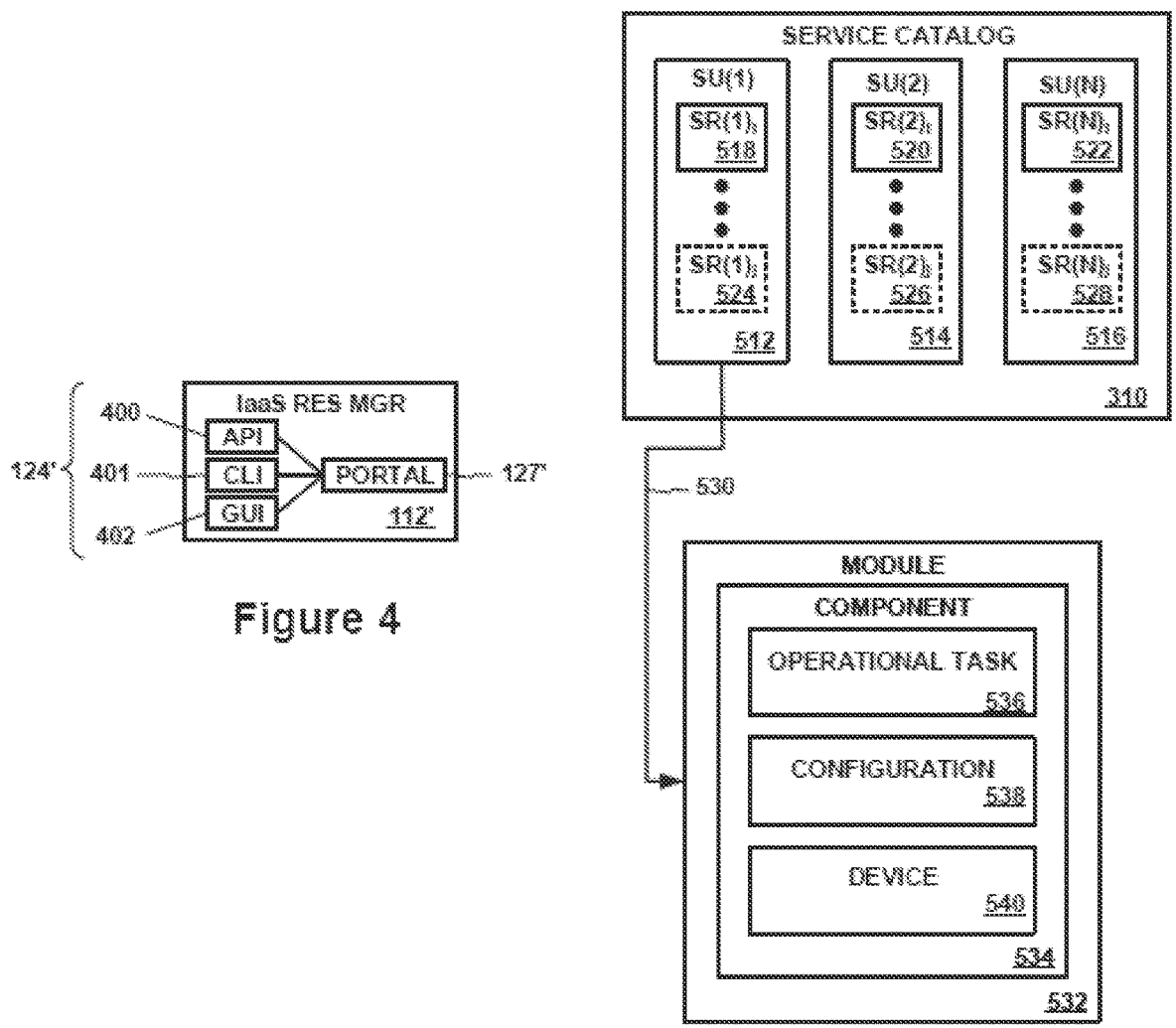
Figure 4
Figure 5

HIGH PERFORMANCE COMPUTE INFRASTRUCTURE AS A SERVICE

CROSS-REFERENCE TO RELATED APPLICATIONS

This application is a continuation application of and claims priority to application Ser. No. 16/287,518, filed on Feb. 27, 2019, the contents of which are hereby incorporated by reference in their entireties.

BACKGROUND

The term "cloud computing" generally denotes the use of relatively large amounts of computing resources provided by a third party over a private or public network. For instance, a business entity might have large amounts of data that it wants to store, access, and process without having to build its own computing infrastructure for those purposes. The business entity might then lease or otherwise pay for computing resources belonging to a third party or, in this context, a "cloud provider". The business entity is a "client" of the cloud provider in this context. The cloud provider might provide the computing resources to the business entity over, in some cases, the World Wide Web of the Internet.

Cloud providers frequently lease computing resources from data centers to re-lease to their clients. Data centers are facilities housing large numbers of computing resources that can be used for storage, processing, switching, and other computing functions. A data center might lease computing resources to a number of cloud providers who may be called "tenants" in this context. Thus, while a cloud provider might have a number of clients, a data center might have a number of tenants.

Various kinds of cloud computing may be categorized as "Platform as a Service" ("PaaS"), "Service as a Service" ("SaaS"), and/or "Infrastructure as a Service" ("IaaS"). PaaS, SaaS, and IaaS may be conceptualize as "layers" of cloud computing because they are typically exploited by different classes of computing resource users. SaaS may be considered the top layer and is the type of computing with which most users interact with a cloud. PaaS may be considered the middle layer, and is used by, for instance, web developers, programmers and coders to create applications, programs, software and web tools. IaaS is the bottom layer and includes the hardware, network equipment and web hosting servers that web hosting companies rent out to users of PaaS and SaaS. More particularly, IaaS includes physical computing hardware (servers, nodes, PDU's, blades, hypervisors, cooling gear, etc.) stored in a data center operated by network architects, network engineers and web hosting professionals/companies.

BRIEF DESCRIPTION OF THE DRAWINGS

Examples described herein may be understood by reference to the following description taken in conjunction with the accompanying drawings, in which like reference numerals identify like elements.

FIG. 3 depicts a particular example of a HPC environment and users thereof in accordance with one or more examples of the present disclosure.

FIG. 4 depicts a IaaS resource manager of the HPC environment of FIG. 3.

FIG. 5 is a schematic illustration of an example of a service catalog with an example of a service unit (SU) implemented on an example of a module according to the present disclosure.

Figure 1:
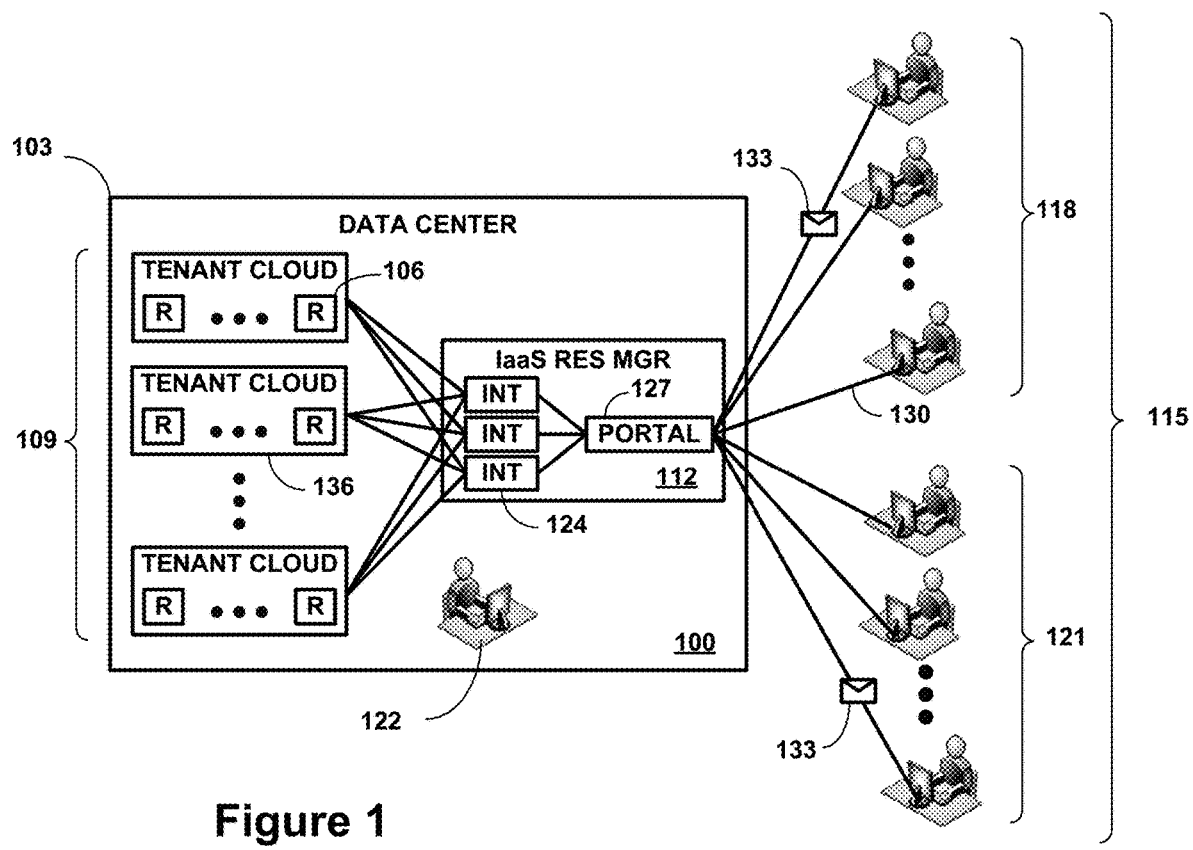
FIG. 1 depicts a high performance computing ("HPC") environment and users thereof in accordance with one or more examples of the present disclosure.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

The present disclosure provides a resource manager for use in a high performance computing ("HPC") environment—that is, a high-thoughput computing environment utilizing very large numbers of processors and typically employing parallel processing techniques. The resource manager includes a plurality of interfaces—such as an Application Program Interface ("API"), a Command Line Interface ("CLI"), and/or a Graphical User Interface ("GUI")—and a portal through which a cloud client may interface securely with a respective one of multiple tenant clouds that comprise the high performance computing environment.

More particularly, in some examples, a high performance computing environment includes a plurality of computing resources, a plurality of tenant clouds organized from the plurality of computing resources, and an IaaS resource manager. The IaaS resource manager includes a plurality of interfaces and a portal. In operation, a cloud user interacts with the portal over a secure link with the interfaces to perform a cloud task relative to a particular one of the tenant clouds of the high performance computing environment.

In other examples, an IaaS resource manager for use in a high performance computing environment, includes a plurality of interfaces and a portal. In operation, a cloud user interacts with the interfaces through the portal to perform a cloud task relative to a particular one of a plurality of tenant clouds of the high performance computing environment.

In still other examples, a method for servicing cloud users from a high performance computing environment, including: receiving from a cloud user a request to perform a cloud task relative to a particular tenant cloud from among a plurality of tenant clouds in the high performance computing environment; responsive to the request, invoking an Infrastructure as a Service resource manager, including presenting a portal to the cloud user over a secure link through which the cloud user interacts with an interface to schedule the cloud task and consume a plurality of computing resources in the high performance computing environment; and responsive to the cloud user interaction, consuming the computing resources in the particular tenant cloud by performing the cloud task.

FIG. 1 depicts a high performance computing environment and users thereof in accordance with one or more examples. More particularly, FIG. 1 depicts a HPC environment 100 housed in a data center 103. The data center 103 provides at least three types of services: Information technology ("IT") Infrastructure Services, Application Services, and Business Services. IT Infrastructure Services include Data Center Local Area Network ("DC LAN"), firewalling, load balancing, etc. IT Infrastructure Services may not be perceived by business users as being part of IT operations. Application Services include network-based services, network-enabled services, mobile services, unified communications and collaboration ("UC&C") services, etc. Application Services are accessible by business users. Business Services include Business Intelligence, vertical applications, Industry applications, etc. With Business Services, the network enables access and data transportation, including possible security performance, isolation, etc.

Services such as the above may be implemented, as in examples described herein, in a data center network, for example, as data center service oriented networking. Such a data center network has a networking infrastructure including computing resources, e.g., core switches, firewalls, load balancers, routers, and distribution and access switches, etc., along with any hardware and software required to operate the same. Some or all of the networking services may be implemented from a location remote from the end-user and delivered from the remote location to the end-user. Data center service oriented networking may provide for a flexible environment by providing networking capabilities to devices in the form of resource pools with related service attributes. Service costs may be charged as predefined units with the attributes used as predefined.

The HPC environment 100 includes a plurality of computing resources ("R") 106 (only one indicated) from which a plurality of tenant clouds 109 are organized. The computing resources 106 may include, for instance, services, applications, processing resources, storage resources, etc. The tenant clouds 109 may be either public or private clouds depending on the preference of the tenant 118 to whom the tenant cloud 109 belongs.

The number of tenant clouds 109 is immaterial to the practice of the subject matter claimed below. Although the HPC environment 100 in this example is shown including only cloud computing systems (i.e., the tenant clouds 109), the subject matter claimed below is not so limited. Other examples may include other types of computing systems, such as enterprise computing systems (not shown). The tenant clouds 109 may be "hybrid clouds" and the HPC environment 100 may be a "hybrid cloud environment". A hybrid cloud is a cloud with the ability to access resources from different sources and present as a homogenous element to the cloud user's services.

Also shown in FIG. 1 are a plurality of cloud users 115. The cloud users 115 include tenants 118 and clients 121. The tenants 118 lease the computing resources 106 from the proprietor of the data center 103, also sometimes called the "provider". The tenants 118 then organize the leased computing resources 106 into a tenant cloud 109. The tenant cloud 109 includes, for instance, hardware and services that a client 121 can use upon payment of a fee to a tenant 118.

This arrangement is advantageous for all three of the provider 122, the tenant 118, and the client 121. For instance, the client 121 then uses, and pays for only those services and other resources that they need. For another instance, the tenant cloud 109 of the tenant 118 is readily scalable if the clients 121 of the tenant 118 need more or fewer computing resources 106 than the tenant cloud 109 needs to meet the computing demands of the clients 121. For still another instance, the data center 103 does not have to worry about the licensing of services and software to the clients 121 but still commercially exploits its computing resources.

Still referring to FIG. 1, the HPC computing environment 100 also includes an IaaS resource manager 112. The IaaS resource manager 112 may include a plurality of IaaS system interfaces 124 (only one indicated) and a resource auditing portal 127. The specifics of what kind of IaaS system interfaces 124 are used will be implementation specific depending on context such as is discussed further below. Portals such as the resource auditing portal 127 are industry methodologies allowing cloud users 115 to interact with the IaaS system interfaces 124.

In operation, a cloud user 115 is typically located remotely to, or off the premises of, the data center 103. The cloud user 115 interacts over a secure link 130 (only one indicated) with the IaaS system interfaces 124 through the resource auditing portal 127 to perform a cloud task relative to a particular one of the tenant clouds 109 of the HPC environment 100. The nature of the cloud task forms a part of the context just mentioned and will also be discussed further below in connection with one particular example.

The links 130 may be one or more of cable, wireless, fiber optic, or remote connections via a telecommunication link, an infrared link, a radio frequency link, or any other connectors or systems that provide electronic communication. Links 130 may include, at least in part, an intranet, the Internet, or a combination of both. The links 130 may also include intermediate proxies, routers, switches, load balancers, and the like.

Figure 2:
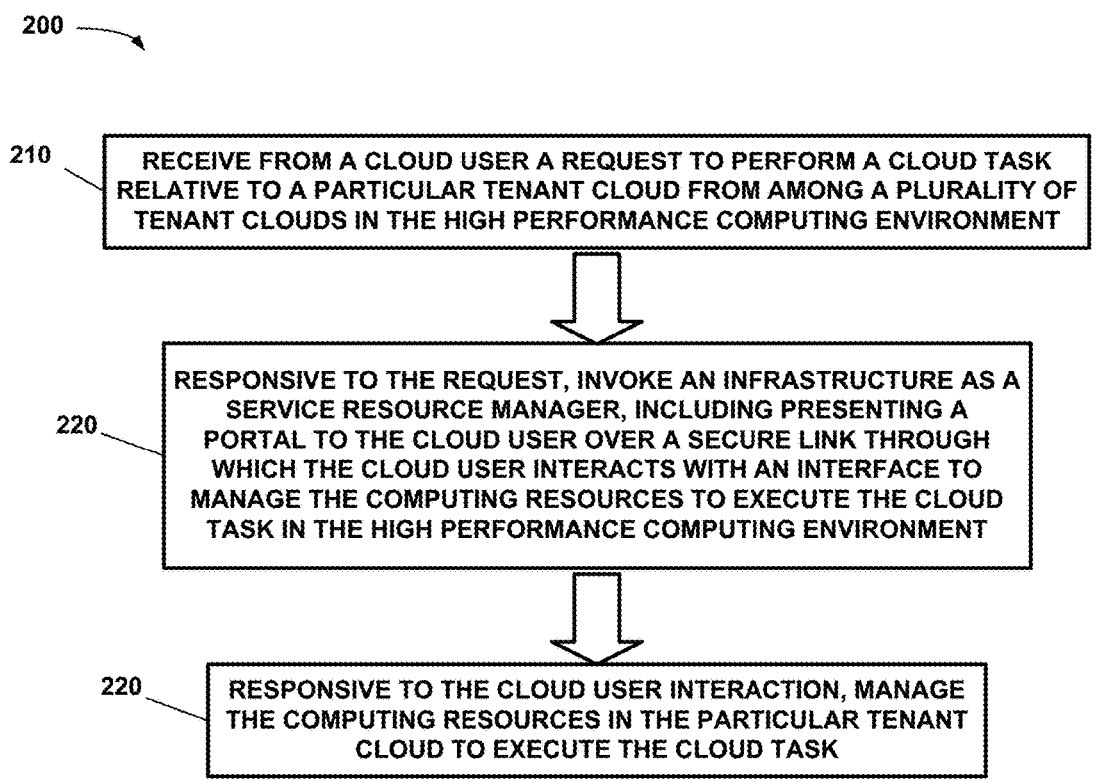
FIG. 2 illustrates one particular example of a method in accordance with the disclosure herein.

FIG. 2 illustrates one particular example of a method in accordance with the disclosure herein. More particularly, FIG. 2 illustrates a method 200 for servicing cloud users from a high performance computing environment. The method 200 will be discussed in the context of the HPC environment 100 of FIG. 1. However, the method 200 is not limited to application in the example of FIG. 1.

Referring collectively to FIG. 1 and FIG. 2, the method 200 begins by receiving (at 210) from a cloud user 115—e.g., a tenant 118 or a client 121—a request 133 to perform a cloud task relative to a particular tenant cloud 136 from among a plurality of tenant clouds 109 in the HPC environment 100. The nature of the cloud task will turn, in part, on whether the cloud user 115 is a tenant 118 or a client 121 because tenants 118 and clients 121 have different roles in the HPC environment 100.

For instance, a tenant 118 may perform cloud tasks such as creating the tenant cloud 136 through a tenant partition of the computing resources 106. A tenant 118 may also make changes to the tenant partition so that the tenant cloud 136 includes more or fewer computing resources 106 than it had previously. Both these functions are not permitted to a client 121. However, the client 121 may perform cloud tasks such as consuming the computing resources 106 of the tenant cloud 136, something a tenant 118 ordinarily would not do.

As shown in FIG. 2, the method 200 continues by, responsive to the request 133 (at 210), invoking (at 220) the IaaS resource manager 112. This includes presenting the resource auditing portal 127 to the cloud user 115 over a secure link 130 through which the cloud user 115 interacts with an IaaS system interface 124 manage the computing resources 106 to execute the cloud task in the high performance computing environment 100. "Managing" the computing resources 106 may include consuming computing resources 106 to execute the cloud task or allocating or deallocating computing resources 106 to the particular tenant cloud 136, for instance.

The method 200 then, responsive to the cloud user interaction (at 220), continues by managing (at 230) the computing resources 106 in the particular tenant cloud 136 to execute the cloud task. This may include performing cloud tasks for either the tenant 118 or a client 121, and the cloud tasks will vary depending on who sent the request and how they want to interact with the tenant cloud 136. Concomittantly, the manner in which the computing resources 106 are managed will vary as well.

To further an understanding of that which is claimed below, one particular example will now be discussed. FIG. 3 depicts one particular example of a HPC environment 300 deployed in a data center 103' operated by a provider 122. The HPC environment 300 includes a plurality of tenant clouds 109, of which, the cloud users 115 will interact with a particular one 136 thereof in a manner described below. The HPC environment 300 also includes an IaaS Resource Manager 112' and a service catalog 310. In some examples, the service catalog 310 may be a part of the IaaS Resource Manager 112'.

Turning now to FIG. 4, in this particular example an Iaas Resource Manager 112' includes a resource auditing portal 127' and a plurality of Iaas System Interfaces 124'. The IaaS System Interfaces 124' include an Application Program Interface ("API") 400, a Command Line Interface ("CLI") 401, and a Graphical User Interface ("GUI") 402. Note that, in some examples, the Iaas Resource Manager 112' may include other types of interfaces in addition to, or in lieu of the GUI 402 shown in FIG. 4. Some examples may also omit the GUI 402. The number and type of the IaaS System Interfaces 124' will depend on the technical specifications of the tenant clouds 109 in a manger that will be apparent to those skilled in the art having the benefit of the present disclosure.

More particularly, the resource auditing portal 127' uses Red Hat CloudForms. Red Hat CloudForms is an opensource, enterprise cloud computing solution usable to create, manage, and monitor cloud environments. The cloud environments may be public, private, or hybrid cloud environments. It is also usable with a variety of cloud and cloud enterprise platforms such as those available from Red Hat, VMWare, Microsoft, OpenStack, Amazon, and Azure. The resource auditing portal 127' provides dashboards, reports, and analytics for measuring and monitoring performance. The resource auditing portal 127' may also be used to monitor cloud infrastructures and resources, manage life cycles for the computing resources, utilize computing resources, optimizing computing resource utilization, manage and control data and infrastructure security, and accommodate automatic provisioning of computing resources.

The developed API 400 is a set of programmable functions, commands and routines for local and remote secure access to the system. The API 400 facilitates interaction between distinct systems and modules which request and accommodate the services from other programs. For instance, the API 400 may facilitate communication between an application 313 for a cloud user 115 and a tenant cloud 109. The implementation uses industry standard Representational State Transfer ("REST") API framework to provide the widest compatability with other systems.

The CLI 401 is a text-based interface. The CLI has both system wide operations access and individual user access (e.g., a tenant 118 or a client 121) whom communicate with the system through the interface text commands. The CLI is a text based interface and is provided as part of the logon node creation process. CLIs are generally used to operate system software per instruction from a user. The user enters a text command, and the CLI command line interpreter parses and executes the instructions. The CLI has information output which can display the results of the execution.

The GUI 402 is a resource ordering and auditing interface in the same vein as most point-and-click user interfaces in common use today. Preconfigured icons and/or menus may be presented on desktop, or display. The user then uses a pointing device such a pointer, track pad, or joystick to control a pointer on the desktop and select icons or menu entries to enter commands.

The use of the IaaS system interfaces 124' may see use depending on context such as the nature of the request 133 and whether the cloud user 115 issuing it is a tenant 118 or a client 121. For example, a login host is created on the IaaS system providing a local login facility where the tenant partition is created. The client can use their credentials to login into this host within their partition and run CLI commands using the CLI 401. The client 121 may also use a remote host with an encrypted tunnel (using again their encrypted credentials) and send command strings to the IaaS resource manager 112' to make changes to the tenant partition through the API 400. Or, the tenant 118, again using their credentials, can log onto the central IaaS central Web server facility (not separately shown) and make changes to their tenant partition using the GUI 402.

The service catalog 310 is, in this particular example, implemented as a database, but other types of data structures may be used in other examples. The service catalog 310 as disclosed herein implements a service definition abstraction layer with an operational model based on Operational Tasks. The service catalog 310 may include services relevant to business purposes of a cloud user 115. The network component architecture may be transparent to a cloud user 115 who selects a service from the service catalog without knowledge of underlying hardware, software, and connections needed to implement the services. The services may be implemented by a data center networking service provider 122, shown in FIG. 3.

FIG. 5 depicts a schematic illustration of an example of the service catalog 310. The service catalog 310 includes one or more service units ("SUs") 512, 514, 516. The service unit 512, 514, 516 is the top-level description of a service including a set of capabilities delivered by the network. For example, such capabilities may be ports, IP addresses, type of network, etc. Each service unit 512, 514, 516 is associated with attributes such as bandwidth, latency, load balancing, etc. to define a service profile as related to a service level agreement ("SLA") for the service. The service catalog 310 may have any number of service units 512, 514, 516, as indicated in FIG. 5 by service unit(1) 512 being one service unit in service catalog 310; service unit(2) 514 being another service unit in service catalog 310; and service unit(N) 516 representing any number of additional service units where N is the total number of service units.

The service units 512, 514, 516 each include corresponding service resources ("SR") 518, 520, 522, respectively. A service resource is an array of parameters, including service resource information, which defines the minimum characteristics of a service unit. Therefore, a service resource includes those characteristics to minimally define the service and no more. In an example, each service resource included in a service unit is selected for inclusion in the service unit based upon an analysis of needs of the cloud user 115, of an operational user, or of both users. For example, cloud users 115 (application architects, service architects, demand managers) may have business or technical needs, and operational users may have operational needs related to network operations. SR(1)$_i$ 518 represents the service resource parameters for SU(1), where SR(1)$_i$ may include any number of parameters, from 1 to i, where i is an integer 1 or greater. SR(2)$_i$ 520 represents service resource parameters for SU(2), and SR(N)$_i$ 522 represents service resources for each service unit up to SU(N).

Table 1 below is an example of a service resource array.

TABLE 1

| SR | Description | Comments |
|---|---|---|
| 1 - Module name | Module identifier | Free alphanumeric description of Module name, to make it recognizable by association with appropriate service |
| 2 - # of layers | Number of layers in the Module | Iterated as many layers are defined Value: 2 (1 VLAN + heartbit), 3, 4 |
| 2i - # of VLAN per layer | Number of VLAN in each layer | Iterated per layer. VLAN size (all VLAN of the layer) is assigned to default value Small (IP Mask:/25) |
| 3 - layer size | DEFAULT: Number of IP addresses (thus related to quantity of devices) requested per layer | Applied to each layer. Default = "Mail service" (best effort) |
| 4 - SLO (Service Level Objective) | DEFAULT - Basic QoS applied to all VLAN of the Layer | Applied to the whole environment as ACL or Firewall rules. It is described from application standpoint. Default = "open - no restriction" (only basic security polices are applied on network components) |
| 5 - Security | DEFAULT - Basic level of security assigned to ALL modules | A minimum acceptable security level common assigned to all DC infrastructure ALL Modules |

In the example shown in Table 1, a service resource array is described by five values. Each of them is expressed to understandable by an application or business service architect. Two (Quality of Service ("QoS") and Security) are set as Default. Without such Default service resource, the service description would be incomplete. The service description may be varied by service attributes ("SAs") (see, e.g., Table 2 below). If no service attribute is applied or service attributes are removed after deployment, the default value is restored. Moreover, if any change is needed to all configurations (e.g., enhanced security policies), related SRi will be changed, and new configurations may be automatically deployed (e.g., via a batch execution) to all existing Modules. Therefore, alignment is provided on the basis of fully predictable impact analysis because all deployed configurations belong to a defined set.

In another example, a service unit may also include a service attribute, as indicated by the dashed lines at boxes 524, 526, 528. A service attribute is an array of parameters that may be used to define a state for a respective service resource from the array of service resources. In an example, a state for a respective service resource may be defined by adjusting or adding to the service resource values. For example, in Table 2 below, service attributes "A" and "B" adjust a value for SR #4 and SR #5, respectively. service attribute "C" adds to the service resource values by adding a new kind of configuration. As such, the service resource values may be considered default values, and service attributes may or may not be included with a particular service unit. A SRi must be set, whereas an SAj may or may not be set. For example, there could be an empty array of service attribute. Further, each service attribute may have its own number of parameters as indicated by the letter j, for example, as in SA(1)j 524, SA(2)j 526, and SA(N)j 528. For instance, SA(1) may have five parameters, and SA(2) may have two parameters, etc.

As depicted by Table 2 below, attributes may be assigned, changed, or removed because the service unit will consistently be described by a service resource array.

TABLE 2

| SA | Description | Comments |
|---|---|---|
| A - layer SLO | QoS applied to a specific VLAN or layer | Related to SR #4. Each QoS is described in terms of application use (Mail = best effort; File = high bandwidth; DB = resiliency and performances guaranteed; Video = High bandwidth) |
| B - security | Level of security applied to a specific layer | Related SR #5. Security level is described as "open" (default, SR), "DMZ", "Back-end", "Critical". Related policies and configuration may be deployed on more components |
| C - port | Specific port configuration on firewall for a layer | Requestor should specify a list of ports to be opened on firewall. Request is fulfilled only after a manual review by security supervisor |
| D - layer size | Size of the layer expressed by assigning appropriate IP Mask | Related to SR #3. Each layer has same size assigned to all VLAN of the layer (by design): Small (/25) is default (SR); Medium (/24); Large (/23, not further extensible) |

For example, as shown in Table 2, according to planned services, service attribute may be applied upon request to one or more VLAN, one or more layer, or all the Modules. SA (A), (B) and (D) supersede the default related service resource values if the service attributes are used. Further, if a service attribute is assigned to an already existing configuration, additional operations on other devices (e.g., servers) may be required. For example, configuration of an IP Mask should be applied to servers to make an extension operable.

Some example service units are shown below in Table 3.

TABLE 3

| SU | Comments |
|---|---|
| [CREATE] {service resource)={Basic; 3; 2; Mail; Open} | Module "Basic" has 3 layers, 2 LAN per layer, SLO "Mail server" applied to all VLANS, "Open" security level applied to all VLANs. Minimal configuration |
| [CREATE] {SR}={Large; 3; 4; Mail; Open} {SA]=(;;;1-large, 2-large, 3-large} | Same as above but with addition of attributes "large" to all VLAN of all 3 layers, and 4 VLAN per layer. Module name is "Large", {SA} are applied immediately after the Module creation |
| [CREATE] [SR}={Big data; 3; 2; Mail; Open} {SA]={3-DB;3-Back End;;3-Back End;;3-large} | "Big Data" Module has a large back-end, positioned on layer-3, to manage big data with high level of security and guaranteed performances |
| [CHANGE=Basic] {SA]={1- File; 2-File} | Service change is applied to "Basic" Module, by increasing to "File" SLO applied to layer 1 and 2. Layer 3 is unchanged |
| [REMOVE=Big Data] | Module "Big Data" is removed, all resources made available for further reuse |

Legend for Table 3:
{SR} = {Domain name; # layers; # VLAN per layer; layer size; layer SLO; security}
{SA} = {layer SLO; security; port configuration; layer size}

With further reference to FIG. 5, delivery of the service as defined by a selected service unit includes assignment of the service unit to a module. In an example, as depicted by arrow 530, SU(1) 512 may be implemented on a module or a plurality of modules, for example, module 532. It is to be understood that each service unit 512 may include identifiers to be clearly distinguished from other, similar service units. The identifiers have substantially no effect on the service that the service unit is expected to deliver, however, the identifiers may facilitate replicating other instances of similar service units on other modules. An example of an identifier may be a NAME of a service unit, e.g., "CRM-SFA test", "CRM-Billing Production", etc., an alphanumeric IDENTIFIER, or other tags.

Module as used herein is a logical space that includes a component (e.g., component 534 as part of module 532). A component includes one or more services of the same type. Examples of component 534 may include: Security (configuration of firewall ("FW") and access control list ("ACL")); Performance (traffic priority and tagging on switches, ACL on switches); Reliability (load balancing ("LB") and clustering); and Switching/Routing. Component 534 is associated with operational task(s) 536, configuration (s) 538, and device(s) 540. In examples of the present disclosure, component 534 may be a plurality of components 534, each associated with its own respective operational task(s) 536, configuration(s) 538, and device(s) 540. For example, one component may be associated with switching/routing, and another component associated with security implemented as a combination of access control list on switches and rules on a firewall for a respective module.

As used herein, a device 540 may be anything connected to the network (physically or virtually) upon which a service is implemented. Examples of a device 540 may include: servers (physical or virtual); storage (logical unit number ("LUN")) and tape libraries, connected via internet small computer systems interface ("iSCSI"), fiber channel over Ethernet ("FCoE"), network attached storage ("NAS")); personal computers ("PC"); and printers. Devices may also include interface(s), e.g., wired and/or logical connections to support various functionality, including, e.g., deployment of the component 534. Each respective device 540 is configured to be deployed when performing the selected service of the component 534.

An operational task ("OT") as used herein means a well-defined, predictable set of instructions that are associated with performing the service. operational tasks may be executed by human operators, proceeding according to defined procedures with no interaction with the requestor (e.g., an application architect). An operational task may be common or unique and may be used in multiple modules. In examples of the present disclosure, an operational task that is executable by human operators may be converted to an automatically executed program operational task by a straightforward transformation. A program operational task is an operational task that includes a program that is loaded in memory and associated with performing the service. A program operational task will be executed by a CPU in accord with the program at the next clock cycle as address registers have been loaded with the initial address of the program.

It is to be understood that module 532 may include various components 534 within one module 532. Further, a component 534 may include multiple operational tasks, configurations and devices. In an example, one or more operational tasks may be activated upon a single request. For instance, a single request may include first configuring a switch, then configuring security, in order to deploy a respective service unit in a module. Additionally, the operational tasks may be unique to each component 534 or used commonly in multiple components 534, along with associated configurations 538 and devices 540.

As mentioned above, the cloud user 115 is not required to have knowledge of the underlying networking structure for implementation of the service. As such, the cloud user 115 is not required to know the technical devices/components included in implementation of a service. The cloud user 115 is further not required to have knowledge of technical information (e.g., language, interfaces, operating system, etc.) for executing the service. The cloud user 115 has an understanding of the services sufficient to request a service because the service units, service resources, and service attributes are all described in a native language of the cloud user 115. Through the service definition abstraction layer (e.g., as depicted at reference numeral 786 in FIG. 7, discussed further below), definition of the service units, service resources, and service attributes uses cloud user service-oriented terminology in examples of the present disclosure. As used herein, cloud user service-oriented terminology is meant to include customer-specific service descriptions under a service level agreement.

In an example, a system for delivering data center networking as a service may include a service catalog engine. The service catalog engine represents, generally, any combination of hardware and programming configured to cause execution of networking services in a data center environment. The service catalog engine may include a service catalog front end to interface with a cloud user 115. In an example, the cloud user 115 may select a networking service from a list of service units. The service catalog engine may also include a service catalog back end to implement the networking services on the network in response to the selected networking service.

According to an example of the present disclosure, services may be consolidated into predefined sets selectable as a single entity. In another example, each service resource may be individually selected from a predefined set (e.g., see Table 1 above). Although in some examples, predefined sets are included to limit the possible combination of services (e.g., to remove some complexity), it is to be understood that, in other examples, service resources may be "free." For example, NAME or IDENTIFIER may be a free input. ALLOWED PORTS may also be a free input field, where a user can specify which specific non standard ports should be opened on the FW to allow an application to work.

Figure 6:
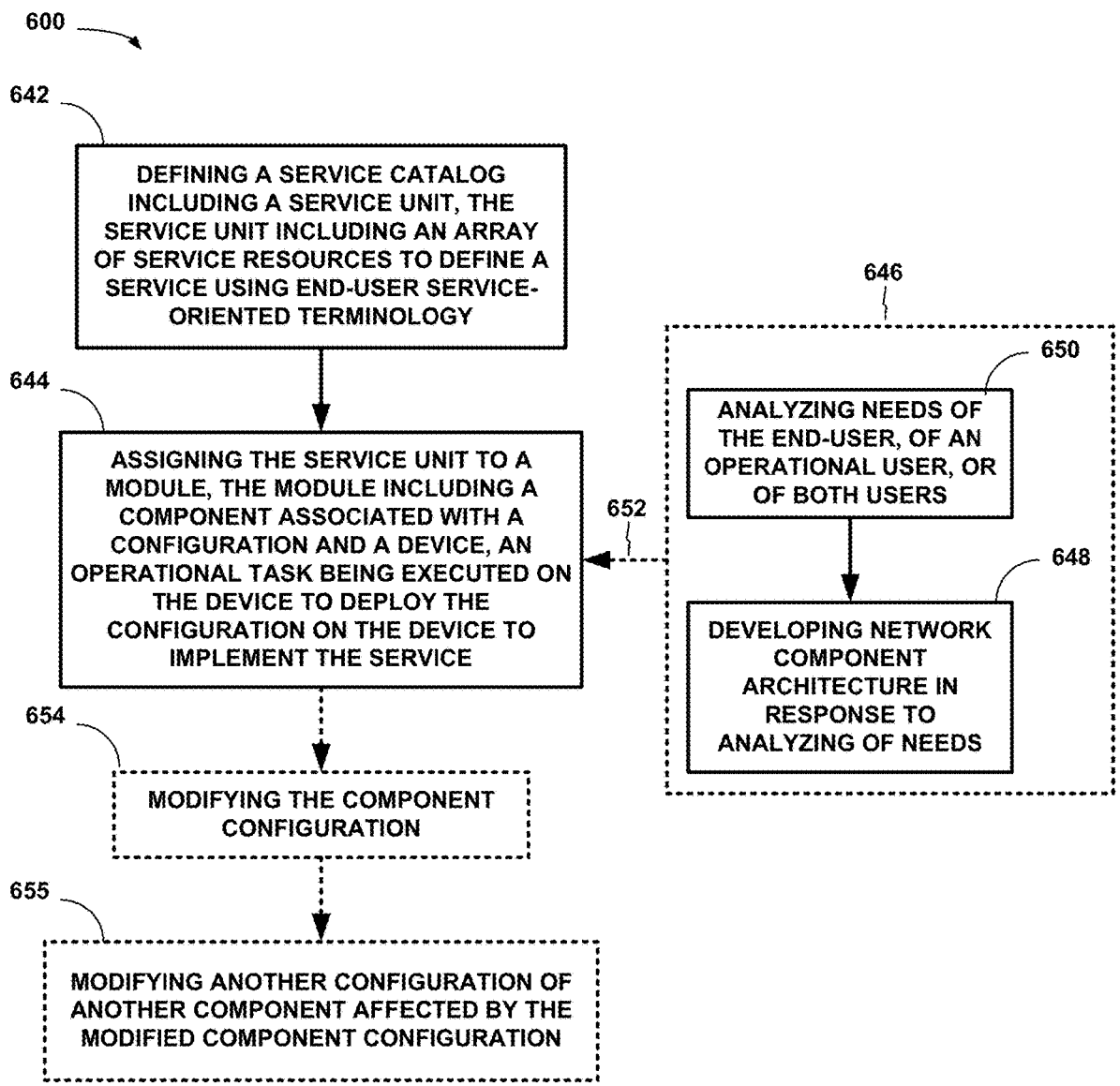
FIG. 6 is a flow diagram depicting an example of implementation of a service catalog (SC), and an example of maintenance of a service catalog (SC) according to the present disclosure.

Referring now to FIG. 5 and FIG. 6 collectively, an example of a method 600 according to the present disclosure includes defining a service catalog including a service unit, the service unit including an array of service resources (service resource) to define a service using cloud user 115 service-oriented terminology, as depicted at box 642. The example method further includes assigning the service unit to module 532, the module 532 including component(s) 534 associated with configuration 538 and device 540. The operational task 536 is executed (automatically or by the operational user) on the device(s) 540 to deploy the appropriate configuration 538 on the device(s) 540 to implement the service, as depicted at box 644.

In another example, as shown in FIG. 6 in dashed line generally at box 646, the method 600 may further include analyzing needs of the user, as depicted at box 648. The needs that are analyzed may depend on the type of user having the needs. As mentioned above, the user may be, for example, a cloud user 115 (e.g., application architect, service architect, demand manager, etc.) who may have business or technical needs to be analyzed. An operational user (e.g., user who runs the network) may have operational needs. The needs of the user may be developed, e.g., according to surveys or audits of existing infrastructure. Alternatively, the needs may be provided according to a set of best practices. Best practices may be developed directly by the provider 122 of the data center network ("DCN"). For example, an internal IT organization that directly operates a DC may develop best practices. Best practices may also be developed indirectly by arrangement with a third party. For example, best practices may be developed by a consultative practice to define a transformational or an evolutionary DCN roadmap.

In response to this needs analysis, a network component architecture may be developed, as depicted at box 650. It is to be understood that, in an example, activity related to box 646 may happen before or after definition of the service catalog 642 and additionally, such activity may happen before or after assignment of a service unit to a module. One of these sequencing options for box 646 is depicted generally by dashed arrow line 652.

Still referring to FIG. 6, in another example, the method 600 may further include modifying module 532 by modifying a component configuration, as depicted in dashed line at box 654. Further, other modules 532 may use the same modified component configuration. As such, the other modules 532 may be updated to incorporate the change into the affected component configurations. Modifying another configuration of another component affected by the modified component configuration is depicted in dashed line at box 655. For example, two or more modules 532 may share a component 534, and when a component configuration in a particular module 532 is changed, the component configuration in another module(s) 532 will change also.

However, in another example, component configuration in one module 532 does not have to affect other modules. For instance, two or more modules 532 may share a component 534, and a component configuration in a particular module 532 may be changed with no impact on the other module(s) 532. This may be accomplished by modification of an SAi value, applying the new value to one module 532 and not to other modules 532. For example, an additional security rule may be introduced to grant compliance to a single module, and therefore can be applied to one module 532 and not to other modules 532.

In an example, a network may have a domain including one or more modules categorized by the domain. Further, a network may have multiple domains. Domains group resources for modules internal to a domain, and may be organized according to business units. For example, a customer relations management ("CRM") domain may include various modules to perform services associated with a CRM business unit. Modules may share resources within a common domain, whereas a domain maintains separate resources from other domains.

Figure 7:
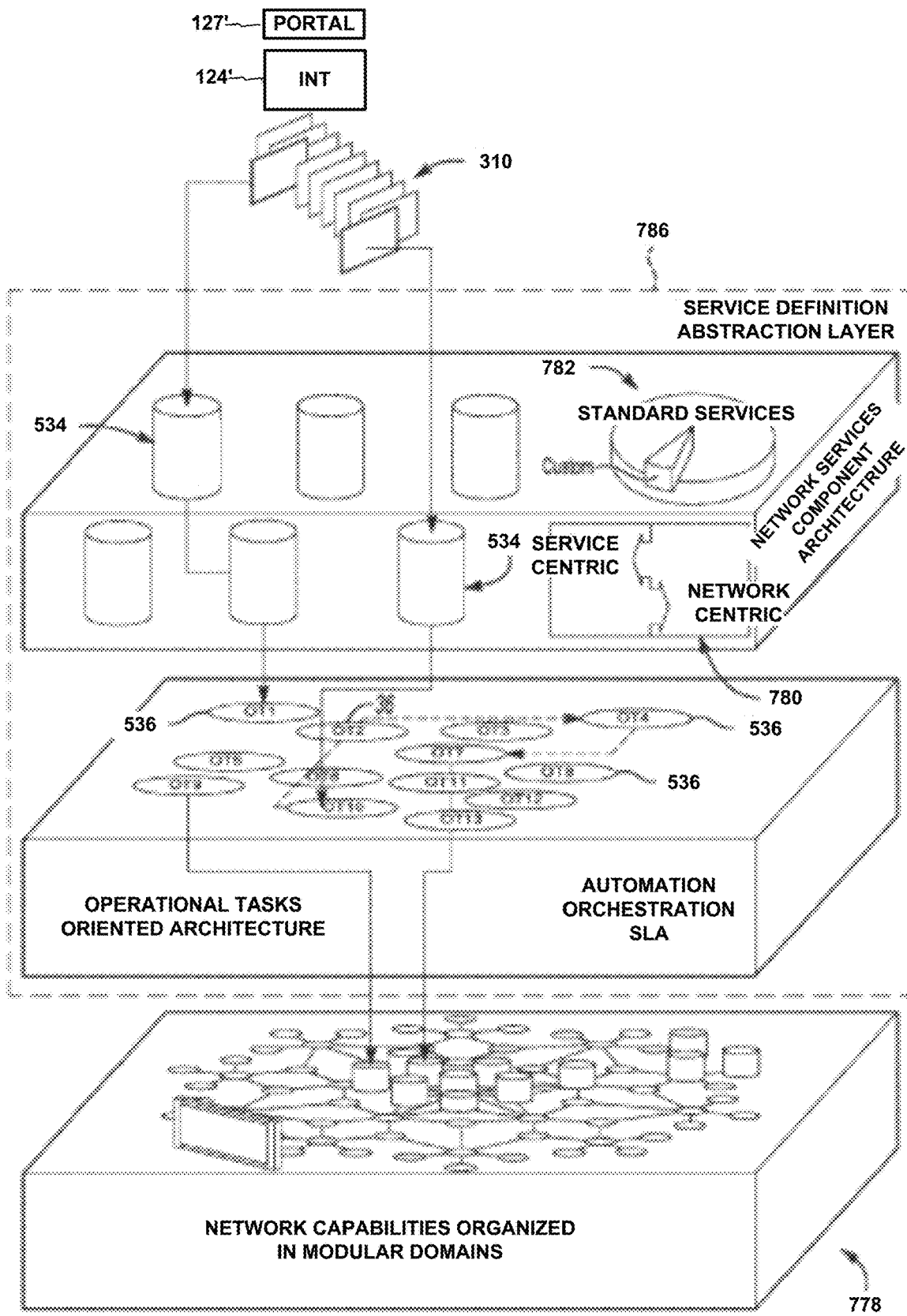
FIG. 7 schematically depicts an overall view of an example of a system according to the present disclosure.

FIG. 7 schematically depicts an overall view of an example of a system as disclosed herein. The cloud user 115 (shown in FIG. 3) accesses the service catalog 310. The service catalog 310 includes services described through the user resource auditing portal 127' and the IaaS System Interfaces 124' in a language that is understandable to the cloud user 115. The service catalog 310 contains a list of predefined and pre-approved services which may cover at least a portion of a company's IT network requirements, as schematically depicted by pie chart 782.

The Network Service Components 534 shown in FIG. 7 are examples of component 534. Component 534 is an abstract element used to define a service. The component 534 has some similarity to a "procedure call" or "library function" in a programming language. When the component 534 is called with specific parameters, the component creates or changes a networking service. As stated above, a service means a set of capabilities delivered by a network. In examples of the present disclosure, services may be provisioned in standardized and predefined modules.

The service definition abstraction layer depicted at 786 virtualizes physical assets' capabilities to the form of standard service components 534. As depicted by image 780, cloud user 115, service-centric requests are translated into deployment instructions to the provider 122 of networking services, shown in FIG. 3, in a networking language. It is to be understood that the provider 122 of networking services may be in a separate business organization from the cloud user 115, or in the same business organization. A request for a service triggers a set of standard operational tasks 536 which select physical capabilities and how the physical capabilities are to be provisioned to satisfy the request for the service. Operational tasks 536 may also be de-provisioned by reverting actions performed by Operational tasks 536 to free DON resources and related service units.

Operational Task Oriented Architecture is a utilization of Service Oriented Architecture of software in the network space. There are many actions that a plurality of networking services may perform in a substantially similar manner. Such actions may be combined in the form of atomic Operational Tasks 536. Service Components 534 provision networking services by executing a set of Operational Tasks 536 in a particular order.

Examples disclosed herein may provide resilience to changes. For example, if a hardware component in the network is changed, it may not be necessary to re-write all networking services (as it would be in currently existing data centers). It is to be understood, however, that new hardware-specific commands may be added to the Operational Tasks 536 workflows in some instances—for example, if the hardware has a new operating system.

Still referring to FIG. 7, the pool of physical network capabilities 778 may include switching, load balancing, firewalling, intrusion detecting, event correlation, etc. In an example, the pool of physical network capabilities 778 may have modular domains and be architecturally based on a Hewlett-Packard Data Center Reference Architecture model. In an example, physical capabilities may be provisioned in the form of standard, independent modules in response to a service request. Such provisioning is in contrast to a system in which allowance for growth or other changes is accommodated by over-provisioning.

The service catalog 310 allows a cloud user 115 to define a service using a non-network language for "users" while providing deployment instructions to the provider 122 of networking services in a networking language understood by network operators in the data center. Examples of the present disclosure may include a service interface that is understandable by cloud users 115 even though implementation of the service component is networking-specialized.

Figure 8:
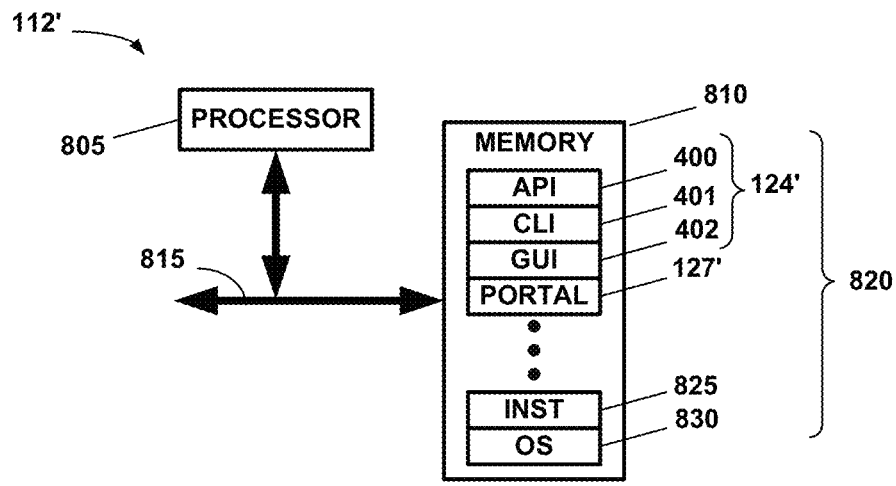
FIG. 8 shows selected portions of the hardware and software architecture of a computing apparatus such as may be employed in some examples to implement the Iaas Resource Manager in the HPC environment of FIG. 3.

In one aspect, the subject matter claimed below includes a software implemented method. FIG. 8 shows selected portions of the hardware and software architecture of a computing apparatus such as may be employed to implement the IaaS Resource Manager 112'. The IaaS Resource Manager 112' includes a processor 805 communicating with storage 810 over a bus system 815. The memory 810 may include a hard disk and/or random access memory ("RAM") and/or removable storage such as a floppy magnetic disk, an optical disk, and/or a flash or thumb drive.

The memory 810 is encoded with software 820 including, the IaaS System Interfaces 124' (i.e., the API 400, CLI 401, and GUI 402), the resource auditing portal 127'. The memory 810 is also encoded with programed instructions 825 and an operating system ("OS") 830. The programmed instructions 825 are executed by the processor 805 to perform the functionalities of the IaaS Resource Manager 112' described herein but not attributable to IaaS System Interfaces 124' or the resource auditing portal 127'. The processor 805 runs under the control of the operating system 830, which may be practically any known operating system. The programmed instructions 825 are invoked by the operating system 830 upon power up, reset, or both, depending on the implementation of the operating system 830. The programmed instructions 825, when invoked, performs the method of the subject matter claimed below.

Figure 9:
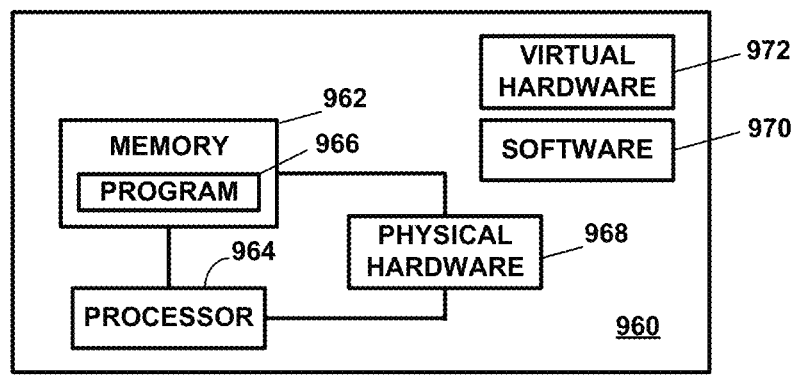
FIG. 9 depicts selected portions of the hardware and software architecture of a computing cloud such as may be employed to implement the tenant clouds of FIG. 1 and FIG. 3.

Turning now to FIG. 9, selected portions of the hardware and software architecture of a computing cloud 960 such as may be employed to implement the tenant clouds 109 of FIG. 1 and FIG. 3. As used herein, the "cloud computing system" or "tenant cloud" refer to a computing system including multiple pieces of hardware operatively coupled over a network so that they can perform a specific computing task. The computing cloud 960 may include a combination of physical hardware 968, software 970, and virtual hardware 972. The cloud 960 is configured to (i) receive requests from a cloud user 115 through the IaaS Resource Manager 112', both shown in FIG. 3, and (ii) return request responses 316 to the cloud user 115 through the IaaS Resource Manager 112', as depicted in FIG. 3. As examples, the computing cloud 960 may be a private cloud, a public cloud or a hybrid cloud. Further, the computing cloud 960 may be a combination cloud computing system including a private cloud (or multiple private clouds) and a public cloud (or multiple public clouds).

The physical hardware 968 may include, among others, processors, memory devices, and networking equipment. The virtual hardware 972 is a type of software that is processed by the physical hardware 968 and designed to emulate specific hardware. As an example, virtual hardware may include a virtual machine ("VM"), i.e., a software implementation of a computer that supports execution of an application like a physical machine.

An application, as used herein, refers to a set of specific instructions executable by a computing system for facilitating carrying out a specific task. For example, an application may take the form of a web-based tool providing users with a specific functionality. It will be understood that an application as used herein refers to an application supporting performing a specific task using computing resources such as, among others, enterprise applications, accounting applications, multimedia related applications, or data storage applications. Software 970 is a set of instructions and data configured to cause virtual hardware 972 and/or physical hardware 968 to execute an application. As such, the cloud computing system can render a particular application available to users associated with the data center 103'.

Executing an application in the computing cloud 960 may involve receiving a number of requests, processing the requests according to the particular functionality implemented by the application, and returning request responses to the requesting client 121. For executing the application, the resources (e.g., physical hardware 968, virtual hardware 972, and software 970) of the computing cloud 960 may be scaled depending on the demands posed on the application. For example, computing cloud 960 may vary the size of the resources allocated to the application depending on the number of requests, the number of users interacting with the application, or requirement on the performance of the application (e.g., a maximum response time). While not shown, it is to be understood that the computing cloud 960 may also include an interface that allows the computing device(s) 56 to communicate with the components of the computing cloud 960.

Referring still to FIG. 9, the physical hardware 968 of the computing cloud 960 may include processor 964 and memory 962. The processor 964 may be any processor that is capable of executing program instructions stored in the memory 962 to implement, for example, the program 966 so as to implement examples of the data center service catalog 310 as disclosed herein. The memory 962 may include an operating system and applications, such as a data center networking service application. The operating system may be a collection of programs that, when executed by the processor 964, serves as a platform on which the data center networking service application can run. Some examples of operating systems include various versions of LINUX and Microsoft WINDOWS.

The examples disclosed herein may be realized in any non-transitory, tangible computer-readable media for use by or in connection with an instruction execution system (e.g., the cloud 960, IaaS Resource Manager 112'), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing cloud 960 or the IaaS Resource Manager 112'. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory ("RAM"), a read-only memory ("ROM"), an erasable programmable read-only memory ("EPROM"), or a portable CD, DVD, or flash drive.

Returning to FIG. 3, in operation, a tenant 118 leases computing lease computing resources 106 organized into a tenant cloud 136. The tenant 118 does so on an hourly basis, for instance, and can scale the tenant cloud 136 by changing the type and quantity of the computing resources 106 in the tenant cloud 136. When the tenant partition of the tenant cloud is created, the tenant 118 receives a secured login name, password, and a Key by the IaaS Resource Manager 112'. The leased computing resources 106 are allocated and assigne a unique Whenever the tenant 118 wishes to perform some cloud task relative to the tenant cloud 136, the tenant 118 sends a request 133 from an application 313 on their computing apparatus 319 and using their secured credentials. The IaaS Resource Manager 112' then provide the tenant with a secure link 130 over which the tenant 118 may conduct their business.

The conduct of business is performed through the resource auditing portal 127' and one of the IaaS System Interfaces 124', and typically through the API 400. The API 400 permits the application 313 to communicate with the IaaS Resource Manager 112' and, so, engenders the "hybrid" nature of the hybrid cloud. The tenant 118 typically is going to offer computationally intensive applications like medical imaging, genome sequencing, mathematical modeling of complex systems, and applications employing large mathematical libraries. The tenant 118 accordingly loads software programming (e.g., the software 970, in FIG. 9) to impart the desired functionality to the tenant cloud 136. The credentials, licenses, certificates, etc. receive an identifier and is stored in the service catalog 310.

So, for example, the tenant 118 might wish to lease 20 nodes in the HPC environment 300 for their tenant cloud 136. The tenant 118 sends a request 133 to the IaaS Resource Manager 112'. The API 400 accesses the service catalog 310 to determine whether the request can be accommodated and, if so, whether the tenant 118 has enough credit to pay for the extra nodes. In essence, the tenant 118 enters a negotiation with the IaaS Resource Manager 112' which uses the API 400 to access the service catalog 310 to retrieve information for the negotiation.

Consider an example where a client 121 is a medical physician, part of whose practice is computationally intensive medical imaging. The software and hardware for this type of imaging may be cost prohibitive for the medical physician. A tenant 118, however, may lease the resources 106 from the data center 103, organize them into a tenant cloud 109 hosting the imaging capabilities that are then licensed out to multiple clients 121. If the computational demands of the clients 121 on the tenant cloud 109 require more processing resources, the tenant 118 may lease more or return excess computing resources 106 from or to the data center 103. Meanwhile, the data center 103 may host several tenant clouds 109 in an attempt to maximize usage of the computing capacity.

Security of the link 130 is achieved in several ways. As mentioned above, both the tenant 118 and the user 121 is a secured login name, password, and a Key by the IaaS Resource Manager 112' that is used to establish the link. The SaaS System Interfaces 124' may also provide security. For instance, the API 400 may be a secure API. The CLI 401, for another instance, is secure because it permits a cloud user 115 to interact with it and perform cloud tasks without exposing the underlying code. Furthermore, certificates for all computing resources 106 are maintained in the service catalog 310 and are accessible. Still further, each cloud user 115 will have a dedicated resource auditing portal 127' rather than sharing a portal with other cloud users 115 (even though only one resource auditing portal 127' is shown FIG. 3). Still other techniques may be employed in other examples not disclosed herein.

The figures set forth herein aid in depicting various architectures, functionalities, and operations of the examples disclosed herein. Throughout the description, many of the elements are defined, at least in part, as programs, programming, or program instructions. Each of these elements, portions thereof, or various combinations thereof may represent in whole or in part a module, segment, or portion of code that includes one or more executable instructions to implement any specified logical function(s). Each element or various combinations thereof may represent a circuit or a number of interconnected circuits to implement the specified logical function(s).

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The technique is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed is:

1. One or more non-transitory computer-readable storage media storing a program executable by one or more processors, the program comprising instructions to:
   receive, from a cloud user of a plurality of cloud users, a request to perform a cloud task relative to a particular tenant cloud of a plurality of tenant clouds of a high performance computing (HPC) environment, the plurality of cloud users comprising at least one tenant user and at least one client user, the particular tenant cloud comprising a set of computing resources organized by the at least one tenant user for usage by the at least one client user, the cloud task being different based on whether the request is from the at least one tenant user or from the at least one client user, wherein the at least one tenant user allocates or deallocates the set of computing resources and the at least one client user consumes the set of computing resources to execute the cloud task;
   establish, by an Infrastructure as a Service (IaaS) resource manager that comprises a plurality of IaaS system interfaces and a resource auditing portal, in response to the request, a secure link over the resource auditing portal between the cloud user and an IaaS system interface of the plurality of IaaS system interfaces to allow the cloud user to interact with the IaaS system interface to perform the cloud task in the HPC environment, wherein the plurality of IaaS system interfaces comprise, a command line interface, a Representational State Transfer application program interface, and graphical user interface; and
   manage, in response to interaction of the cloud user with the IaaS system interface, the computing resources in the particular tenant cloud to execute the cloud task.

2. The one or more non-transitory computer-readable storage media of claim 1, further comprising an enterprise computing system organized from a plurality of computing resources whose resources are to be consumed through the resource auditing portal of the IaaS resource manager.

3. The one or more non-transitory computer-readable storage media of claim 1, wherein the HPC environment is a hybrid cloud environment.

4. The one or more non-transitory computer-readable storage media of claim 1, wherein the secured link is secured using encrypted credentials.

5. A system, comprising:
   a plurality of computing resources of a high performance computing (HPC) environment, the plurality of computing resources comprising hardware-based computing resources;
   a plurality of tenant clouds organized from the plurality of computing resources;
   an Infrastructure as a Service (IaaS) resource manager of the HPC environment, the IaaS resource manager comprising:
      a plurality of IaaS system interfaces; and
      a resource auditing portal to interact with a plurality of cloud users that comprise at least one tenant user and at least one client user;
   wherein the IaaS resource manager is to:
      receive, from a cloud user of the plurality of cloud users, a request to perform a cloud task relative to a particular tenant cloud of the plurality of tenant clouds of the HPC environment, the particular tenant cloud comprising a set of computing resources organized by the at least one tenant user for usage by the at least one client user, the cloud task being different based on whether the request is from the at least one tenant user or from the at least one client user, wherein the at least one tenant user allocates or deallocates the set of computing resources, and wherein the at least one client user consumes the set of computing resources to execute the cloud task;
      establish, in response to the request, a secure link over the resource auditing portal between the cloud user and an IaaS system interface of the plurality of IaaS system interfaces to allow the cloud user to interact with the IaaS system interface to perform the cloud task in the HPC environment; and
      manage, in response to interaction of the cloud user with the IaaS system interface, the computing resources in the particular tenant cloud to execute the cloud task; and
   an enterprise computing system organized from the plurality of computing resources whose resources are to be consumed through the resource auditing portal of the IaaS resource manager.

6. The system of claim 5, wherein the plurality of IaaS system interfaces comprise:
   a command line interface;
   an application program interface; and
   a graphical user interface.

7. The system of claim 6, wherein the application program interface is a Representational State Transfer application program interface.

8. The system of claim 5, wherein the particular tenant cloud is a private cloud computing environment.

9. The system of claim 5, wherein the HPC environment is a hybrid cloud environment.

10. The system of claim 5, wherein the secured link is secured using encrypted credentials.

11. A computer-implemented method, comprising:
    receiving, from a first cloud user of a plurality of cloud users, a first request to perform a first cloud task relative to a particular tenant cloud of a plurality of tenant clouds of a high performance computing (HPC) environment, the plurality of cloud users comprising at least one tenant user and at least one client user, the particular tenant cloud comprising a set of computing resources organized by the at least one tenant user for usage by the at least one client user, the first cloud task being different based on whether the first request is from the at least one tenant user or from the at least one client user, wherein the at least one tenant user allocates or deallocates the set of computing resources and the at least one client user consumes the set of computing resources to execute the first cloud task;

establishing, in response to the first request, a secure link over a first resource auditing portal between the first cloud user and a first IaaS system interface of a plurality of IaaS system interfaces to allow the first cloud user to interact with the first IaaS system interface to perform the first cloud task in the HPC environment, wherein the plurality of IaaS system interfaces comprise, a command line interface, a Representational State Transfer application program interface, and graphical user interface; and managing, in response to interaction of the first cloud user with the first IaaS system interface, the computing resources in the particular tenant cloud to execute the first cloud task.

12. The computer-implemented method of claim 11, further comprising:

receiving from a second cloud user a second request to perform a second cloud task relative to a particular enterprise computing system of a plurality of computing systems in the HPC environment;

establishing, in response to the second request, a secure link over a second resource auditing portal between the second cloud user and a second IaaS system interface of the plurality of IaaS system interfaces to allow the second cloud user to interact with the second IaaS system interface to perform the second cloud task in the HPC environment; and managing, in response to interaction of the second cloud user with the second IaaS system interface, the computing resources in the particular enterprise computing system to execute the second cloud task.

13. The computer-implemented method of claim 11, wherein the particular tenant cloud is a private cloud computing environment.

14. The computer-implemented method of claim 11, wherein the HPC environment is a hybrid cloud environment.

15. The computer-implemented method of claim 11, wherein the secured link is secured using encrypted credentials.

\* \* \* \* \*